UNITED STATES PATENT OFFICE 2,508,927

ALDEHYDES

Owen A. Moe and Donald T. Warner, Minneapolis, Minn., assignors to General Mills, Inc., a corporation of Delaware No Drawing. Application February 18, 1949,
Serial No. 77,286

12 Claims. (Cl. 260—465)

The present invention relates to various aldehyde compounds having the following structural formula:

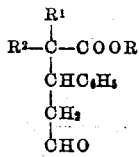

in which R is an alkyl group containing from one to four carbon atoms, $R^1$ is selected from the group consisting of CN and COOR, and $R^2$ is an N-acyl group.

The aldehyde compounds of the present invention are useful in numerous ways, particularly in the synthesis of amino acids. In view of the high functionality of the molecule these compounds are useful for many typical organic reactions and in the synthesis of new substituted amino acids.

It is therefore an object of the present invention to provide novel aldehyde compounds having the above general formula.

Another object of the present invention is to provide a novel process for producing such aldehydes.

These aldehydes may be prepared by the 1,4 addition of cinnamyl aldehyde to N-acyl malonic esters and N-acyl cyanoacetic esters, which addition results in the direct production of the desired aldehyde. These reactions are carried out in the presence of an alkaline catalyst such as an alkali metal alkoxide, or in the presence of amino compounds such as tributylamine. With the alkali metal alkoxide, best yields of the aldehyde compound are obtained when the amount of the catalyst is held within the approximate range of 0.001 to 0.10 mole per mole of reagent used. Variations of catalyst outside this range may be employed, but in general, when the amount of catalyst exceeds the one-tenth mole ratio, there is a tendency for side reactions which cut down the yield of the desired aldehyde, and accordingly such higher molar ratios of catalyst are not preferred. With other catalysts, such as tributylamine, the quantity of catalyst is not as critical and larger quantities may be used up to equimolar proportions.

The reaction is carried out in the presence of a suitable solvent diluent which does not enter into the reaction. Almost any solvent diluent which meets this test can be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal to the volume of the ester employed. In general, the larger the quantity of solvent employed, the easier it is to control the reaction in the desired direction. It is apparent that the quantity of solvent employed is limited by the problem of recovering the solvent.

The temperature employed during the addition reaction is subject to considerable change. Usually a temperature within the range of 0–50° C. is desirable. At temperatures above 50° C. there is some possibility of side reactions.

In carrying out the reaction, it is preferred to prepare a solution of the malonic ester or the cyanoacetic ester in the solvent and to add the catalyst to this solution. The resultant solution is then cooled to a suitable temperature for reaction with the cinnamyl aldehyde, which is then added slowly to the preliminary solution over an extended period of time. In this way it is very readily possible to control the temperature of the reaction mixture to within the desired range, and thus to control the reaction in the desired direction. After the reaction has been completed, the catalyst may be neutralized and the product worked up in a conventional manner.

The reaction is capable of being applied to a number of compounds. Thus the alcoholic group of the malonic ester or the cyanoacetic ester may be either methyl, ethyl, propyl, or butyl. However, inasmuch as these esters are conveniently available in the form of the ethyl ester, this form is preferred. Likewise, while the N-acyl group is preferably acetamido, other N-acyl groups may be used. Suitable N-acyl groups include phthalimido, succinimido, formamido, and in general any N-acyl group which may be readily hydrolyzed to liberate the free amino acid group.

The following examples will serve to illustrate the invention:

Example 1

Ethyl acetamidocyanoacetate (17 g.) was dispersed in 100 cc. of absolute ethanol and sodium ethoxide (from 0.05 g. of sodium in 10 ml. ethanol) was added. The reaction mixture was cooled to 25° C. and cinnamyl aldehyde (13.2 g.) was added dropwise. The temperature increased to 33° C. after the addition of aldehyde was complete. The acetamidocyanoacetate slowly dissolved in the reaction mixture and after one hour a clear solution had resulted. The reaction was allowed to continue for an additional three hours and then the catalyst was neutralized by the addition of glacial acetic acid. The neutralized solution after standing for 72 hours at room temperature, yielded gamma-carbethoxy-gamma-cyano-gamma-acetamido-beta-phenylbutyraldehyde as a crystalline solid. This product melted at 158–

160° C. after crystallization from ethanol. Gamma-acetamido-gamma-carbethoxy-gamma-cyano-beta-phenylbutyraldehyde was characterized as its phenylhydrazone which melted at 176–177° C. after crystallization from ethanol.

*Analysis.*—Gamma-acetamido-gamma-carbethoxy-gamma-cyano-beta-phenylbutyraldehyde Calcd. for $C_{16}H_{18}O_4N_2$: C, 63.58; H, 5.96; N, 9.27. Found: C, 63.22; H, 5.73; N, 9.87.

*Example 2*

Absolute ethanol (50 ml.) was reacted with 0.06 g. of sodium and the resulting sodium ethoxide solution was mixed with 10.85 g. of ethyl acetamidomalonate. To this reaction mixture, at an initial temperature of 27° C., 6.6 g. of cinnamyl aldehyde was added and the temperature increased to 35° C. during the next 20 minutes. The reaction was allowed to proceed for an additional 16 hours at room temperature and then was warmed to 55° C. for ½ hour. The product was then obtained as a viscous oil by removal of the solvent in vacuo. This viscous oily material slowly crystallized and upon mixing with 100 ml. of petroleum ether-ether mixture a crystalline solid, gamma-acetamido-gamma,gamma-dicarbethoxy-beta-phenylbutyraldehyde was obtained. This product, after purification by crystallization from benzene, melted at 93–94° C. The 2,4-dinitrophenylhydrazone of gamma-acetamido-gamma,gamma-dicarbethoxy-beta-phenylbutyraldehyde was prepared and after purification by crystallization from ethyl acetate, melted at 192.5–193° C.

*Analysis.*—Calcd. for $C_{24}H_{27}O_9N_5$: C, 54.55; H, 5.14; N, 13.23. Found: C, 54.25; H, 5.01; N, 13.35.

Compounds of the present invention are useful in the preparation of novel substituted tryptophanes in accordance with the following series of reactions:

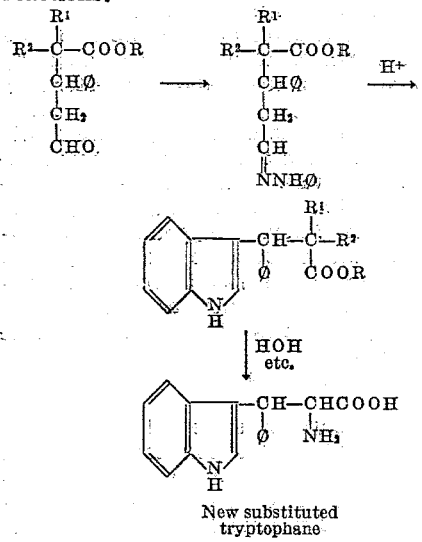

New substituted tryptophane

These compounds are also useful in the preparation of novel substituted glutamic acids in accordance with the following reactions:

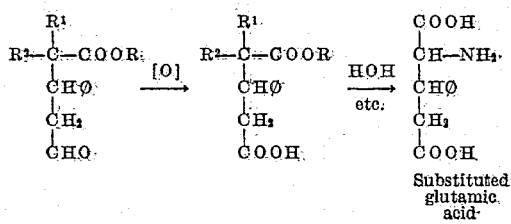

Substituted glutamic acid

While various modifications of the invention have been described, it is to be understood that the invention is not limited thereto, but that other variations are possible without departing from the spirit thereof.

We claim as our invention:

1. Aldehyde compounds having the following formula:

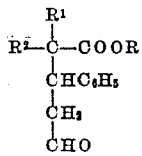

in which R is an alkyl group containing from one to four carbon atoms, $R^1$ is selected from the group consisting of CN and COOR, and $R^2$ is an N-acyl group, in which the nitrogen is attached to the aldehyde carbon chain and in which the acyl group is a carboxylic acyl group.

2. Aldehyde compounds having the following formula:

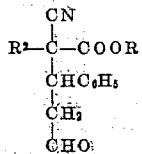

in which R is an alkyl group containing from one to four carbon atoms, and $R^2$ is an N-acyl group, in which the nitrogen is attached to the aldehyde carbon chain and in which the acyl group is a carboxylic acyl group.

3. Aldehyde compounds having the following formula:

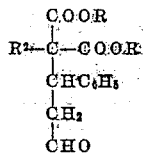

in which R is an alkyl group containing from one to four carbon atoms, and $R^2$ is an N-acyl group, in which the nitrogen is attached to the aldehyde carbon chain and in which the acyl group is a carboxylic acyl group.

4. Aldehyde compounds having the following formula:

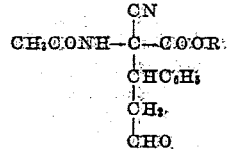

in which R is an alkyl group containing from one to four carbon atoms.

5. Aldehyde compounds having the following formula:

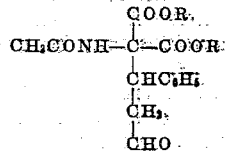

in which R is an alkyl group containing from one to four carbon atoms.

6. Beta-phenyl-gamma-acetamido-gamma-cyano-gamma-carbethoxybutyraldehyde.

7. Beta-phenyl-gamma-acetamido-gamma,gamma-dicarbethoxybutyraldehyde.

8. Process of preparing aldehyde compounds having the following formula:

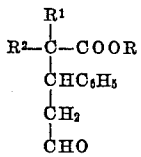

in which R is an alkyl group containing from one to four carbon atoms, $R^1$ is selected from the group consisting of CN and COOR, and $R^2$ is an N-acyl group, in which the nitrogen is attached to the aldehyde carbon chain and in which the acyl group is a carboxylic acyl group, which comprises reacting cinnamyl aldehyde with a compound selected from the group consisting of N-acyl substituted cyanoacetic esters and malonic esters, in the presence of an alkaline catalyst.

9. Process of preparing aldehyde compounds having the following formula:

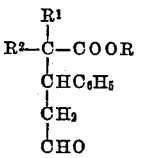

in which R is an alkyl group containing from one to four carbon atoms, $R^1$ is selected from the group consisting of CN and COOR, and $R^2$ is an N-acyl group, in which the nitrogen is attached to the aldehyde carbon chain and in which the acyl group is a carboxylic acyl group, which comprises preparing a solution of a compound selected from the group consisting of N-acyl substituted cyanoacetic esters and malonic esters, in an inert solvent, and reacting said solution with cinnamyl aldehyde in the presence of an alkaline catalyst.

10. Process of preparing aldehyde compounds having the following formula:

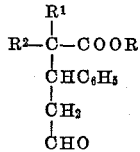

in which R is an alkyl group containing from one to four carbon atoms, $R^1$ is selected from the group consisting of CN and COOR, and $R^2$ is an N-acyl group, in which the nitrogen is attached to the aldehyde carbon chain and in which the acyl group is a carboxylic acyl group, which comprises preparing a solution of sodium ethoxide and a compound selected from the group consisting of N-acyl substituted cyanoacetic esters and malonic esters, in absolute ethanol, and gradually adding thereto cinnamyl aldehyde, and maintaining the temperature of the reaction mixture at not substantially in excess of 50° C.

11. Process of producing beta-phenyl-gamma-acetamido-gamma-cyano-gamma-carbethoxybutyraldehyde which comprises preparing a solution of sodium ethoxide and ethylacetamidocyanoacetate in absolute ethanol and gradually adding thereto cinnamyl aldehyde, while maintaining the temperature of the reaction mixture at not substantially in excess of 50° C.

12. Process of producing beta-phenyl-gamma-acetamido-gamma,gamma-dicarbethoxybutyraldehyde which comprises preparing a solution of sodium ethoxide and ethylacetamido-malonate in absolute ethanol, gradually adding cinnamyl aldehyde thereto, and maintaining the temperature of the reaction mixture at not substantially in excess of 50° C.

OWEN A. MOE.
DONALD T. WARNER.

No references cited.